United States Patent [19]
Lee

[11] Patent Number: 4,696,485
[45] Date of Patent: Sep. 29, 1987

[54] OSCILLATING WEIGHT CARRIERS

[76] Inventor: Robert E. Lee, 640 S. Main St., Los Angeles, Calif. 90014

[21] Appl. No.: 508,028

[22] Filed: Jun. 27, 1983

Related U.S. Application Data

[63] Continuation-in-part of Ser. No. 895,511, Apr. 11, 1978, Pat. No. 4,451,055.

[51] Int. Cl.⁴ .............................................. B62M 1/00
[52] U.S. Cl. .............................. 280/221; 280/11.115; 280/226 A
[58] Field of Search .............. 280/11.115, 221, 226 A, 280/220

[56] References Cited

U.S. PATENT DOCUMENTS

| | | | |
|---|---|---|---|
| 581,453 | 4/1897 | Boldt | 280/11.115 |
| 999,660 | 8/1911 | Koppel | 280/11.115 |
| 2,449,871 | 9/1948 | Bohler | 280/11.115 |

Primary Examiner—John J. Love
Assistant Examiner—Donn McGiehan

[57] ABSTRACT

An improved system of vehicle propulsion utilizing the shifting of weight on various platforms, seats, and handles by a rider. An endless chain driving connected to the platform or handle reciprocates to drive, through a one-way clutch, ground engaging wheels in a forward direction. In other words weight is converted into forward thrust.

4 Claims, 6 Drawing Figures

OSCILLATING WEIGHT CARRIERS

This is a continuation in part of application Ser. No. 895,511, filed 4/11/78 and now U.S. Pat. No. 4,451,055.

BACKGROUND OF THE INVENTION

This invention relates to weight carriers. The weight carriers are actuated by the shifting of weight. Weight is loaded on the embodiments in which the weight forces the wheels to turn. An object of this invention is to provide a means of transportation which is inexpensive to manufacture, and uses no fuel.

This invention is an improved system of propulsion with weight carriers. According to this invention the weight carriers are propelled by the shifting of weight. Weight is loaded or applied to the weight carrier; the downward force of weight forces the weight carrier forward. The embodiments herein show various modifications of mechanical means to convert weight into forward thrust.

SUMMARY OF THE INVENTION

An object of this invention is to provide a means of transportation which is inexpensive to manufacture and use no fuel.

A further object of this invention is to provide a propulsion means that will be practical for recreational usage.

It is a further object of this invention to provide a weight carrier adaptable to many uses.

Still additional objects, benefits and advantages of this invention will become evident from a study of the following detailed description taken in conjunction with the accompanying drawings, in which:

DESCRIPTION OF THE PREFERRED EMBODIMENTS

Figure 1:
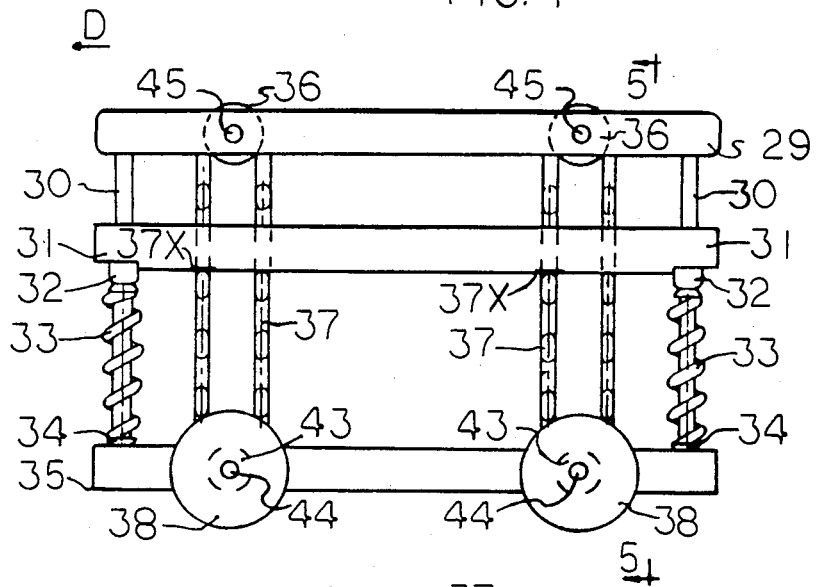
FIG. 1 is pictorial side-view of a foot operated embodiment having a vertically reciprocating platform.

As shown in the drawings, the weight carrier vehicles are propelled by the shifting of weight. In all the embodiments, the weight of a rider forces down a moveable platform handle or seat.

Figure 2:
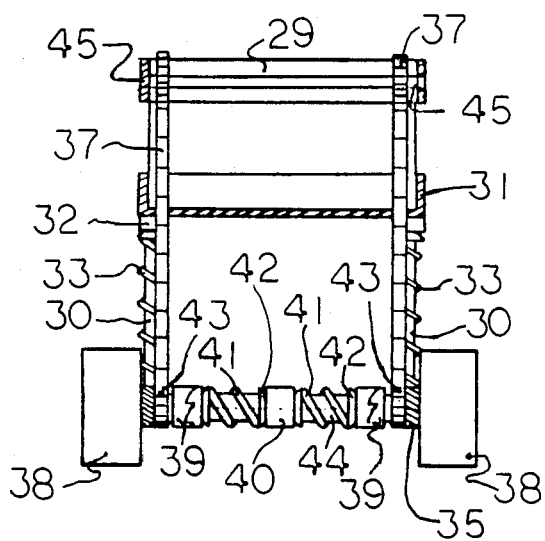
FIG. 2 is a cross-sectional end view of FIG. 1.

Referring now to FIGS. 1 and 2 there is shown a roller skate carriage having an upper frame member 29 and a lower frame member 35. A plurality of rods 30 connect the frame members. The lower frame member has axles 44 carrying ground engaging wheels 38.

A foot board 31 is slidably mounted on the rods for vertical oscillation. A plurality of compression springs 33, slide bearings 32 on the foot board and washers 34 are carried by the rods to effect lifting of the footboard when the weight of the rider is removed.

Between the sides of the upper frame member are mounted a pair of spindles 45 with idler sprockets 26 attached for rotation. In the lower frame member are a set of drive sprockets 43 and a set of one-way ratchet chutches 39 biased by springs 41 into engagement.

Between the upper and lower frame members are roved a plurality of endless chains 37 engaging the idler sprockets and said drive sprockets having one run of each chain connected in driving relationship at point 37x for driving the ground engaging wheels when the foot board is pushed downward by the weight of the rider. The oscillating movement of the chain is converted through the one-way clutchs to rotary forward motion of the wheels.

Figure 3:
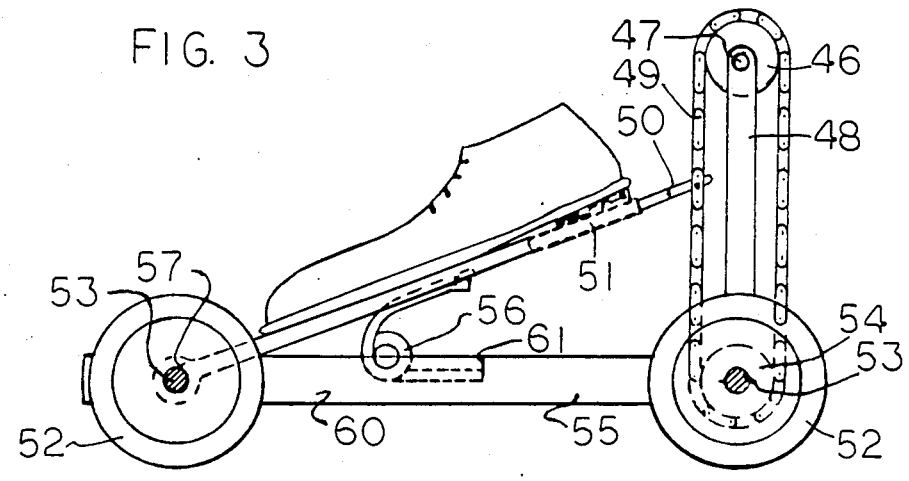
FIG. 3 is a pictorial side view of a roller skate embodiment of the present invention.
Figure 4:
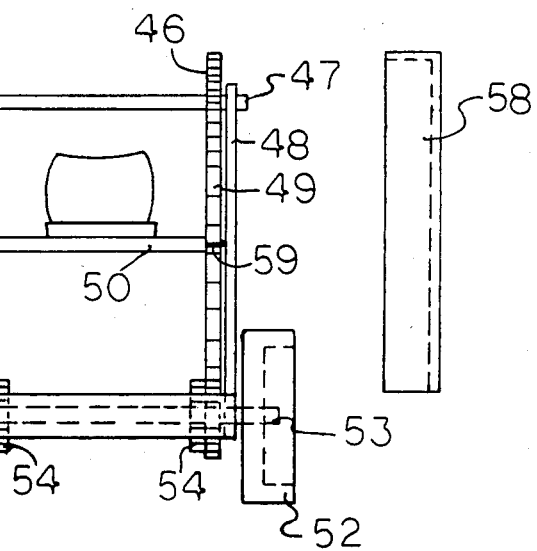
FIG. 4 is an end view of the roller skate of FIG. 3.

Referring now to FIGS. 3 and 4 there is shown another roller skate carriage embodiment having a lower frame member 55 having axles 53 carrying ground engaging wheels 52, and a vertical frame member 48 attached at the rear of the lower frame member.

A foot board 51 is attached at its forward end 57 pivotally about the forward axle 53. A spring 56 is connected between the lower frame member and the footboard to raise the footboard when weight is removed.

At the upper end of the vertical frame member, there is mounted a spindle 47 rotatably carrying a pair of idler sprockets 46. At the bottom of the vertical frame member and at the rear of the lower frame member, there are located a set of drive sprockets 54 mounted on the axle carrying the ground engaging wheels. A set of one-way clutches are driving connected between the sprockets 54 and the wheels 52.

A pair of endless chains 49 roved around the idler sprockets 46 and drive sprockets 54 has one run thereof attached in driving relationship to the footboard via a sliding arm means to accommodate the varying distance between the angularly oscillating footboat and the chain.

Figure 5:
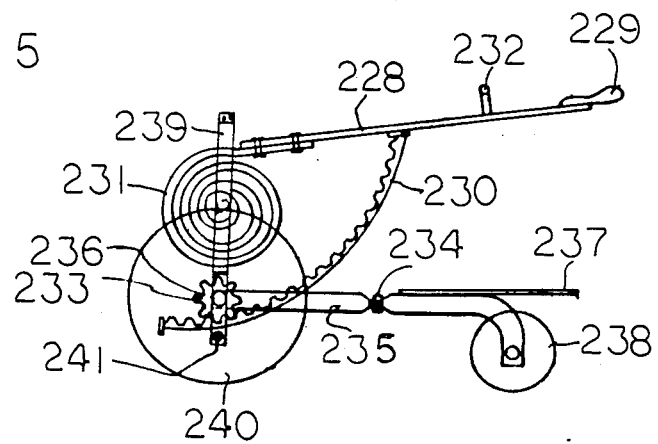
FIG. 5 is a pictorial side view of a see-saw driven embodiment of the invention.

Referring now to FIG. 5, there is shown a see-saw bike embodiment having a forward frame member 235 connected by a vertical steering pivot to a rearward frame member. A vertical frame member 239 is connected to the forward end of said forward frame member. The rear forward frame member has a pair of axially and laterally spaced ground engaging wheels 238 with a footboard 237 mounted thereon.

The forward frame member 235 has an axle 236 and ground engaging wheels 240 mounted for rotation. A pinion and one-way clutch 233 are mounted on the axle and are in driving relationship with the wheel.

At the upper end of the vertical frame member there is an Achimedes spiral spring 231 connected to the frame at the inside end thereof. The outer end of the spring is connected to a see-saw lever 228 having a seat 229 and a handle 232 towards the rear for grasping by a rider.

Pivotally connected to a median point of the lever is a curved rack 230 in driving relationship with the pinion and clutch 233. An idler 241 maintains the rack in contact with the pinion. Weight applied to the see-saw lever causes the one-way clutch to engage to effect forward motion. Steering is effected by shifting body weight side wise.

Figure 6:
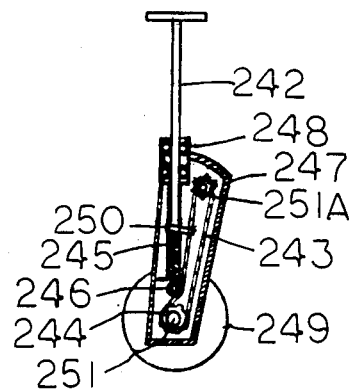
FIG. 6 is a cross-sectional view of a bolo wheel hand and foot driven embodiment of the invention.

Referring now to FIG. 6, there is shown another embodiment of the weight carrier vehicle referred to as a bolo wheel that is hand and foot propelled. A carriage having a vertical frame member 247 has an axle shaft 251 carrying a ground engaging wheel 249, a drive sprocket and one-way clutch 244. A vertically moveable handle 242 is slideably mounted at the top by a bearing 248 and is biased upwardly by a compression spring 245. A spindle 251a, at an upper portion of the vertical frame member, has an idler sprocket rotatably mounted thereon. An endless chain 243 roved around the idler sprocket and and the drive sprocket has one run connected to the bottom 250 of the handle.

The suitable building techniques and the variety of materials that may be used therein are well known and require no separate description herein.

It will be recognized that the embodiments therein are only illustrative and that various modifications and changes therein may be made without departing from the underlying and essential features hereinafter claimed.

I claim:

1. A weight carrier vehicle propelled by shifting of weight comprising:
   a carriage having upper and lower frame members, a plurality of rods connecting said frame members, said lower frame member having axles with ground engaging wheels fixed to said axles;
   a footboard slideably mounted on said rods for vertical oscillation;
   a plurality of compression springs carried by said rods between said lower frame member and said footboard;
   a pair of spindles mounted on said upper frame member with idler sprockets rotatably mounted on said spindles;
   a set of drive sprockets mounted on said axles carrying said ground engaging wheels;
   a set of one-way clutches mounted on said axles and drivingly connected between said sprockets and said ground engaging wheels; and
   a plurality of endless chains engaging said idler sprockets and said drive sprockets with one run of each chain connected to said footboard in driving relationship for driving said ground engaging wheels by the vertical oscillation of said footboard.

2. A weight carrier vehicle propelled by the shifting of weight comprising:
   a carriage having a lower frame member having axles carrying ground engaging wheels, and a vertical frame member attached at the rear of the lower frame member;
   a footboard pivotally mounted at its forward end to said lower frame member;
   a spring connected between said lower frame member and said footboard for biasing said footboard in an upward direction;
   a spindle mounted on the upper end of said vertical frame member rotatably carrying a pair of idler sprockets;
   a set of drive sprockets mounted on said axle carrying the rear ground engaging wheels;
   a set of one-way clutches mounted on the rear axle and drivingly connected between said drive sprockets and said ground engaging wheels;
   a pair of endless chains engaging said idler sprockets and said drive sprockets; and
   one run of each chain connected to said footboard at the rearward end thereof through a sliding arm means to accommodate the varying distance and in driving relationship, for driving said ground engaging wheels by angular oscillation of said footboard.

3. A weight carrier vehicle propelled by the shifting of weight comprising:
   a carriage having an axle carrying a ground engaging wheel at the bottom thereof and a vertical frame member;
   a vertically moveable handle slideably connected at the top of said vertical frame member;
   a spring connected between said handle and said vertical frame member for urging said handle upwardly;
   a spindle mounted at the upper end of said vertical frame member rotably carrying an idler sprocket;
   a drive sprocket mounted on said axle carrying said ground engaging wheel;
   a one-way clutch mounted on said axle and driving connected between said drive sprocket and said ground engaging wheel; and
   an endless chain engaging said idler sprocket and said drive sprocket with one run of said chain connected to said handle at the bottom end thereof in driving relationship for driving ground engaging wheel by vertical oscillation.

4. A weight carrier vehicle propelled by shifting of weight comprising:
   a carriage member having a forward frame member pivotally connected about a vertical axis to a rearward frame member, and a vertical frame member connected to said forward frame members, said forward frame member having an axle carrying ground engaging wheels;
   a footboard and a pair of axial laterally spaced ground engaging wheels mounted on said rearward frame member at the rearward end thereof;
   a spring connected to said vertical frame;
   a see-saw lever connected at its forward end to said spring and having a seat and handle at its rearward end;
   a curved rack attached to the median of said see-saw lever and slidably connected to a lower portion of said vertical frame member;
   a pinion attached for rotation to the forward member coaxial with said axle and meshed with said rack; and
   a one-way clutch mounted on said axle and drivingly connected between said pinion and said ground engaging wheel.

* * * * *